(12) United States Patent
Cha et al.

(10) Patent No.: US 8,942,509 B2
(45) Date of Patent: Jan. 27, 2015

(54) APPARATUS AND METHOD CREATING GHOST-FREE HIGH DYNAMIC RANGE IMAGE USING FILTERING

(75) Inventors: Joon Hyuk Cha, Incheon (KR); Kyoung Mu Lee, Seoul (KR); Yong Seok Heo, Seoul (KR); Young Su Moon, Seoul (KR); Sang Uk Lee, Seoul (KR); Shi Hwa Lee, Seoul (KR)

(73) Assignees: Samsung Electronics Co., Ltd., Suwon-Si (KR); SNU R&DB Foundation, Seoul (KR)

( * ) Notice: Subject to any disclaimer, the term of this patent is extended or adjusted under 35 U.S.C. 154(b) by 246 days.

(21) Appl. No.: 13/158,804

(22) Filed: Jun. 13, 2011

(65) Prior Publication Data
US 2012/0141029 A1 Jun. 7, 2012

(30) Foreign Application Priority Data
Jun. 14, 2010 (KR) .................. 10-2010-0055973

(51) Int. Cl.
| | | |
|---|---|---|
| G06K 9/36 | (2006.01) | |
| G06T 5/50 | (2006.01) | |
| G06T 5/00 | (2006.01) | |
| H04N 5/235 | (2006.01) | |

(52) U.S. Cl.
CPC . *G06T 5/50* (2013.01); *G06T 5/009* (2013.01); *H04N 5/2355* (2013.01); *G06T 2207/20208* (2013.01)
USPC .......................................... 382/284; 382/274

(58) Field of Classification Search
None
See application file for complete search history.

(56) References Cited

U.S. PATENT DOCUMENTS

| 7,239,805 | B2 * | 7/2007 | Uyttendaele et al. .......... 396/222 |
|---|---|---|---|
| 2005/0013501 | A1 * | 1/2005 | Kang et al. ..................... 382/254 |
| 2006/0177150 | A1 * | 8/2006 | Uyttendaele et al. .......... 382/284 |
| 2010/0053346 | A1 * | 3/2010 | Mitsunaga ................. 348/208.6 |
| 2010/0328489 | A1 | 12/2010 | Bauer et al. |
| 2011/0310970 | A1 * | 12/2011 | Lee et al. .................. 375/240.16 |
| 2012/0141029 | A1 * | 6/2012 | Cha et al. ....................... 382/171 |
| 2013/0028509 | A1 * | 1/2013 | Moon et al. ................... 382/162 |

FOREIGN PATENT DOCUMENTS

| KR | 10-2005-0009694 | 1/2005 |
|---|---|---|
| KR | 10-2006-0012278 | 2/2006 |
| KR | 10-2010-0040651 | 4/2010 |
| WO | WO 2008/080736 | 7/2008 |

OTHER PUBLICATIONS

Lee et al Image registration for multi-exposed HDRI and motion deblurring Proc. SPIE 7246 Computational imaging VII Feb. 2009.*
Heo et al Ghost Free Dynamic Range Imaging ACCV'10 Proceedings of the 10th Asian conference on Computer vision Nov. 2010.*

(Continued)

*Primary Examiner* — Sean Motsinger
(74) *Attorney, Agent, or Firm* — Staas & Halsey LLP

(57) ABSTRACT

An apparatus and method creating a ghost-free High Dynamic Range Image (HDRI) based on filtering are provided. It is possible to effectively prevent a ghost phenomenon from occurring when a single HDRI is created from a plurality of LDRIs, by defining a ghost area using a probability based on a global transfer function indicating a relationship for intensities of several frames, rather than searching for or identifying a ghost area in a single or each image.

26 Claims, 4 Drawing Sheets

(56) References Cited

OTHER PUBLICATIONS

Paul E. Debevec et al., "Recovering High Dynamic Range Radiance Maps from Photographs", University of California at Berkeley, 10 pages, SIGGRAPH97, Aug. 1997.
Extended European Search Report dated Aug. 1, 2014 in corresponding European Patent Application No. 11169803.1.
"Artifact-free High Dynamic Range Imaging", Orazio Gallo et al., 2009 IEEE.
"Determining the Camera Response from Images: What is Knowable?", Michael D. Grossbert et al., IEEE Transactions of Pattern Analysis and Machine Intelligence, vol. 25, No. 11, Nov. 2003, pp. 1455-1467.
"Robust Radiometric Calibration and Vignetting Correction", Seon Jee Kim et al., IEEE Transactions on Pattern Analysis and Machine Intelligence, vol. 30, No. 4, Apr. 2008, pp. 562-576.
"Recovering High Dynamic Range Radiance Maps from Photographs", Paul E. Debevec et al., Computer Graphics Proceedings, Annual Conference Series, 1997, pp. 369-378.
"On Being 'Undigital' with Digital Cameras: Extending Dynamic Range by Combining Differently Exposed Pictures", S. Mann et al., S&T's $48^{th}$ Annual Conference Proceedings, pp. 442-448.
"Fast Bilateral Filtering for the Display of the High-Dynamic-Range Images", Frédo Durand et al., Laboratory for Computer Science, pp. 257-266.
"Fast HDR Image Generation Technique Based on Exposure Blending", Andrey Vavilin et al., IEA/AIE 2010, Part III, LNAI 6098, pp. 379-388.

* cited by examiner

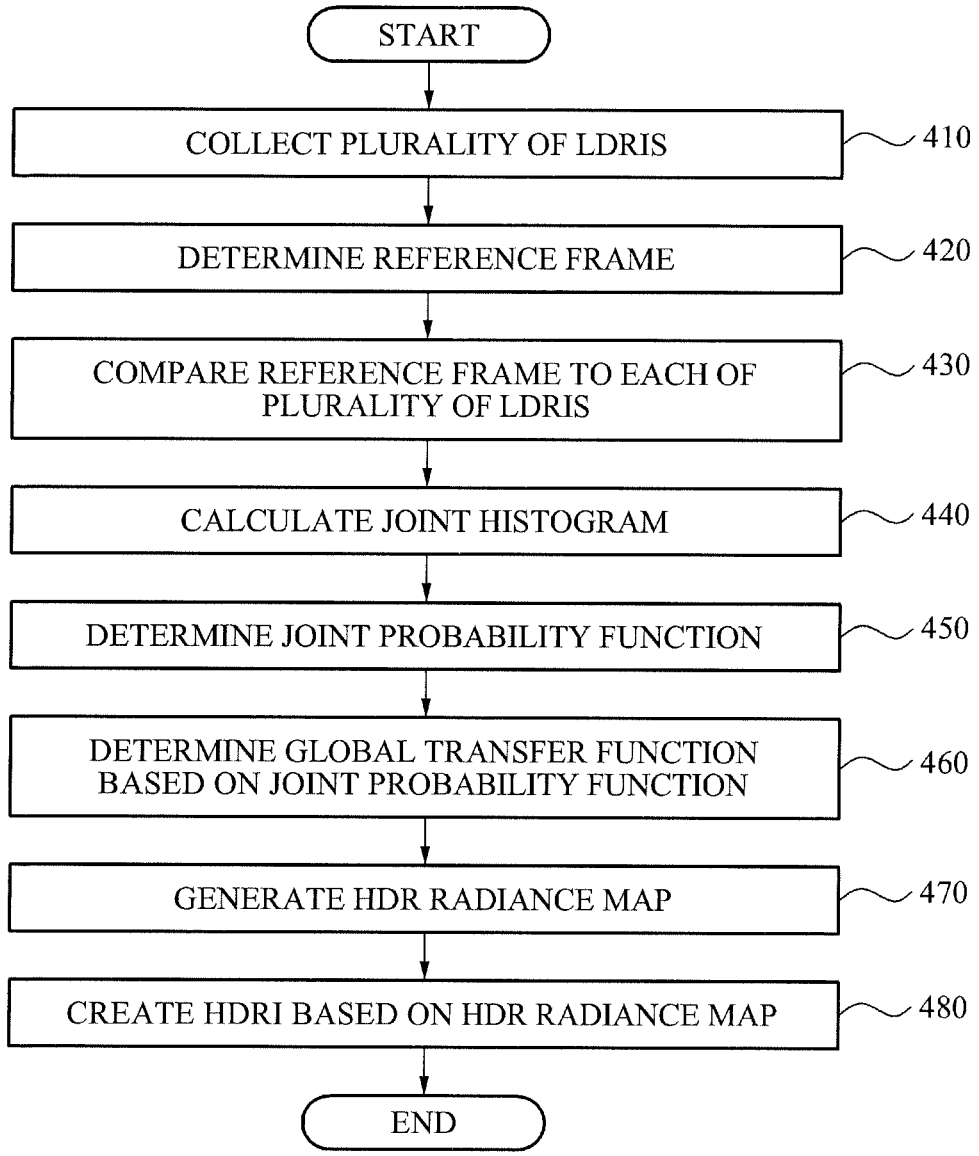

APPARATUS AND METHOD CREATING GHOST-FREE HIGH DYNAMIC RANGE IMAGE USING FILTERING

CROSS-REFERENCE TO RELATED APPLICATIONS

This application claims the benefit of Korean Patent Application No. 10-2010-0055973, filed on Jun. 14, 2010, in the Korean Intellectual Property Office, the disclosure of which is incorporated herein by reference.

BACKGROUND

1. Field

One or more embodiments of the following description relate to an apparatus and method for creating a ghost-free High Dynamic Range Image (HDRI) based on a filtering, that may obtain an effect as if a fixed camera captures consecutive images of a stationary object, when a moving camera continuously captures a scene with a moving object by varying an exposure.

2. Description of the Related Art

Most of technologies for creating a single High Dynamic Range Image (HDRI) using several Low Dynamic Range Images (LDRIs) acquired from a single scene by varying an exposure of a camera are based on an assumption that the scene is fixed.

However, since an object is typically moving in real-world environments, it is difficult to acquire several LDRIs from a single fixed scene.

A phenomenon where a single object appears several times in an HDRI may occur due to motions of the object. Such a phenomenon is referred to as a ghost phenomenon.

A scheme of preventing the ghost phenomenon may be broadly divided into two schemes.

A first scheme is performed to classify pixels of an LDRI into a background and a foreground, and to define a foreground area where motion exists as a ghost area.

A second scheme is performed to define a reference frame among several LDRIs, and to determine an area where a motion is determined to exist as a ghost area, based on the reference frame.

When the first scheme is used, an interesting object in motion may be incorrectly classified as a ghost, and removed. Accordingly, the second scheme may be more effective in practical aspect than the first scheme.

In conventional schemes of solving this ghosting problem based on a reference frame, a ghost area may be detected using appropriate schemes, the detected ghost area may be excluded, and a weighted sum of radiances of several exposures may be performed using the Debevec and Malik's method, set forth in 1997, so that a final radiance value may be determined and the HDRI created.

However, generally, it is difficult to exactly and accurately identify a ghost area. Additionally, when a ghost area is incorrectly identified, pixel value(s) corresponding to the actual ghost area may still be included in the combining of weighted values. Accordingly, an HDRI may still contain the undesired ghosting.

SUMMARY

The foregoing issues are overcome and/or other aspects are achieved by providing a High Dynamic Range Image (HDRI) creation apparatus, including a Low Dynamic Range Image (LDRI) collection unit to collect a plurality of LDRIs while varying an exposure of one or more image capturing devices, and an HDRI creation unit to identify a reference frame from among the plurality of collected LDRIs, to compare the identified reference frame to each of the plurality of collected LDRIs, to determine a joint probability function based on the comparison, and to create an HDRI based on the determined joint probability function.

The foregoing issues are overcome and/or other aspects are achieved by providing an HDRI creation method, including collecting a plurality of LDRIs while varying an exposure of one or more capturing devices, identifying a reference frame among the plurality of collected LDRIs, based on a determined visibility of the plurality of collected LDRIs, comparing the identified reference frame to each of the plurality of collected LDRIs, and determining a joint probability function based on the comparing, and creating an HDRI based on the determined joint probability function.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects and advantages will become apparent and more readily appreciated from the following description, taken in conjunction with the accompanying drawings of which:

FIG. 4 illustrates an HDRI creation method, according to one or more embodiments.

DETAILED DESCRIPTION

Figure 1:
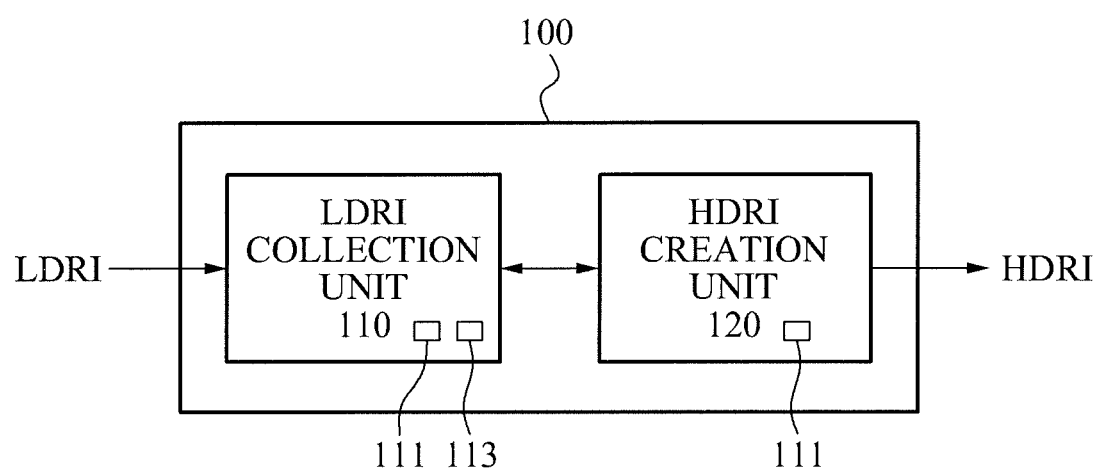
FIG. 1 illustrates a High Dynamic Range Image (HDRI) creation apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a High Dynamic Range Image (HDRI) creation apparatus, according to one or more embodiments.

The creation apparatus 100 of FIG. 1 may include a Low Dynamic Range Image (LDRI) collection unit 110 and an HDRI creation unit 120, for example.

The LDRI collection unit 110 may collect a plurality of LDRIs while varying an exposure of an image capturing device. In one or more embodiments, the LDRI collection unit 110 includes one or more memories 111, e.g., a non-volatile memory and/or a temporary volatile memory, e.g., to store captured image data, and/or one or more image capturing devices 113. In one or more embodiments, the plurality of LDRIs are captured while there is relative movement between an image capturing device 113 and the object(s) desired to be captured. For example, an object desired to be captured may be moving while the an image capturing device 113 is attempting to capture the object, such as in a panoramic scene where the movement of the object changes the fixed position of the object relative to the moving image capturing device 113. Alternatively, in an embodiment, the object may not be moving and only the image capturing device 113 is moving. Additionally, in an embodiment, the capturing by the one or more image capturing devices may be a sequence of image data, such as frames of a captured video, and the LDRI images may be obtained from respective frames.

Here, in one or more embodiments, the LDRI refers to a general bitmap image, and may be interpreted, for example, as an image that may represent 256 colors at 8 bits per pixel in a Joint Photographic Experts Group (JPEG) format, a Tagged Image File Format (TIFF), a Bitmap (BMP) format, and the like, noting that alternative formats and image data representations are also available.

Additionally, in one or more embodiment, the HDRI may be interpreted as an image that may store colors of each pixel together with a brightness intensity value. The HDRI differs from the LDRI, which may merely store information regarding colors, for example.

The HDRI may enhance a representation range of an image, and information regarding an amount of light of the HDRI may enable for a distinguishing between pixels having the same color in a single image.

The HDRI creation unit 120 may determine a reference frame among the plurality of collected LDRIs, may compare the determined reference frame to each of the plurality of collected LDRIs, may determine a joint probability function, and may create an HDRI based on the determined joint probability function.

Specifically, the HDRI creation unit 120 may define an area where a ghost occurs (hereinafter, referred to as a ghost area) using a probability based on a global transfer function, rather than specifically searching for or determining the ghost area in the plurality of LDRIs collected, while varying the exposure of the image capturing device 113. In an embodiment, a detection for ghost areas or ghosting is not performed by the HDRI creation apparatus 100 for any one image or LDRI. Accordingly, the HDRI creation unit 120 may effectively prevent a ghost phenomenon from occurring when a single HDRI is created from a plurality of LDRIs. Here, the global transfer function may indicate a relationship for intensities of several frames.

Hereinafter, a HDRI creation unit, such as the HDRI creation unit 120 of FIG. 1, will be further described with reference to FIG. 2.

Figure 2:
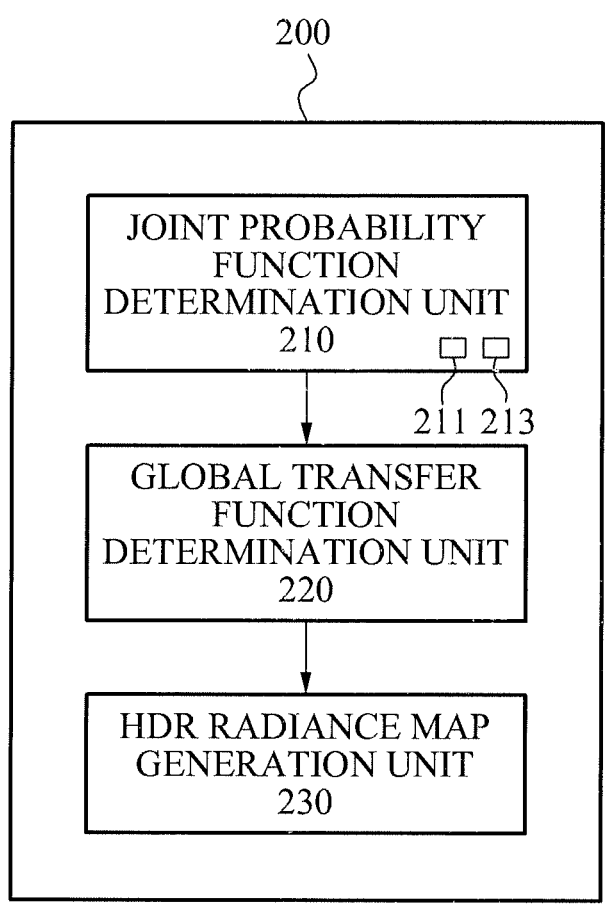
FIG. 2 illustrates an HDRI creation unit, according to one or more embodiments.

FIG. 2 illustrates an HDRI creation unit, according to one or more embodiments.

The HDRI creation unit 200 of FIG. 2 may include a joint probability function determination unit 210, a global transfer function determination unit 220, and an HDR radiance map generation unit 230, for example. The joint probability function determination unit 210 may define the ghost area using a probability based on the global transfer function that indicates a relationship of intensities of a plurality of frames.

The joint probability function determination unit 210 may include a reference frame determination unit 211 and a joint histogram calculation unit 213, for example.

The reference frame determination unit 211 may determine a reference frame from among the plurality of LDRIs. The joint histogram calculation unit 213 may compare the determined reference frame to each of the plurality of LDRIs, and may calculate a joint histogram for each exposure of the plurality of LDRIs.

The reference frame determination unit may identify, as the reference frame, a frame of an image having a best visibility, according to particular determined criteria, among the plurality of LDRIs.

Here, the visibility is one of image characteristics related to an intensity of a frame, and thus may be used to compare the reference frame to other frames obtained by excluding the reference frame from the plurality of LDRIs.

Additionally, the joint probability function determination unit 210 may determine a joint probability function based on the calculated joint histogram.

Specifically, when N exposure frames are continuously input, the joint probability function determination unit 210 may determine, as a reference frame, a frame having a best visibility among the N exposure frames, and may calculate a joint histogram for each exposure of the N exposure frames using the N exposure frames and the reference frame.

The joint probability function determination unit 210 may calculate a joint probability function (PDF) by appropriately processing the calculated joint histogram.

The joint probability function may be represented as a probabilistic relationship of a global intensity between frames having different exposures.

More specifically, the joint probability function determination unit 210 may calculate a joint histogram for an intensity value at a same location, based on the probabilistic relationship of the global intensity between the frames having different exposures.

The joint histogram may be calculated using the below Equation 1, as only an example.

$$P_{n_0,n}^k(i, j) = \frac{1}{N}\sum_p T\left[(i, j) = \left(I_{n_0}^k(p), I_n^k(p)\right)\right]$$ Equation 1

In Equation 1, '$n_0$' denotes a reference frame, 'i' denotes an intensity of the reference frame, 'n' denotes an n-th frame among a plurality of LDRIs, and 'j' denotes an intensity of the n-th frame.

Here, in one or more embodiments, may be interpreted as an element of a collection of red, green, and blue colors, for example. Additionally, 'T[ . . . ]' may have by a value of '1' when the bracketed portion of Equation 1 indicates a true result. Similarly, 'T[ . . . ]' may have the value of '0' when the bracketed portion of Equation 1 indicates a false result, noting that 'T[ . . . ]' could be oppositely defined, or alternative identifiers or approaches may be available. Furthermore, 'N' may denote a number of all pixels p in a single image, for example.

To convert the joint histogram into a joint probability function, a Parzen window processing, for example, may be performed on the joint histogram using a two-dimensional (2D) Gaussian function, also as an example.

Additionally, in one or more embodiments, normalizing may be performed so that a total probability of the joint histogram may be '1', though alternative normalizations are available.

The global transfer function determination unit 220 may calculate a global transfer function between the reference frame and other frames, based on the calculated joint probability function, e.g., as calculated by the joint probability function determination unit 210.

The global transfer function may be calculated using the below Equation 2, as only an example.

$$B_n^k(i) = \sum_{j=0}^{255} P_{n_0,n}^k(i, j) \cdot j \qquad \text{Equation 2}$$

In Equation 2, the global transfer function may be calculated by applying a Mean Squared Error Estimate (MSEE) to the calculated joint probability function for the reference frame, such as calculated using Equation 1.

To calculate a smoother curve of the global transfer function, the least-square may be performed on the calculated global transfer function, such as calculated using Equation 2, or the global transfer function may be approximated using an n-degree polynomial, noting that alternatives are available.

In one or more embodiments, the HDR radiance map generation unit 230 may perform a generalized filtering based on a bilateral filter with respect to the determined global transfer function, and may generate an HDR radiance map.

In one or more embodiments, the generalized filtering is a locally weighted average filtering, noting that alternatives are available.

The HDRI creation unit 200 may create the HDRI based on the generated HDR radiance map.

Specifically, a relationship between a radiance value E(p) and an inverse camera response function 'g( )' may be represented by the below Equation 3, as only an example.

$$ln\, E(p) = g(I_n(p)) - ln\, \Delta t_n \qquad \text{Equation 3}$$

In Equation 3, $\Delta t_n$ may denote an exposure time for frames.

In one or more embodiments, the relationship of Equation 3 is defined as a weighted sum of radiance values of each frame, noting that alternatives are available.

The HDRI creation unit 200 may perform a generalized filtering with respect to the determined global transfer function, and may generate an HDR radiance map.

Here, the generalized filtering may be based on the bilateral filter, as only an example.

In other words, the HDRI creation unit 200 may filter a wider area, and may determine a final radiance.

The HDRI creation unit 200 may determine the final radiance using the below Equation 4, also only as an example.

$$ln\hat{E}(p) = \sum_n \sum_{q \in N(p)} w(I_n(q))c_{n_0,n}(p, q)d(p, q)lnE_n(I_n(q)), \qquad \text{Equation 4}$$

$$c_{n_0,n}(p, q) = \exp\left(\frac{-\|I_n(q) - B_n(I_{n_0}(p))\|^2}{\sigma_c^2}\right),$$

$$d(p, q) = \exp\left(\frac{-\|p - q\|^2}{\sigma_d^2}\right),$$

$$w(z) = \begin{cases} z - z_{min} & \text{for } z \leq 0.5(z_{min} + z_{max}) \\ z_{max} - z & \text{for } z > 0.5(z_{min} + z_{max}) \end{cases}.$$

In one or more embodiments, the HDRI creation unit 200 may use three weight functions $c_{n_0,n}(p,q)$, $d(p,q)$, and $w(z)$ shown in Equation 4, to filter a wider area from an image, and to determine the final radiance.

Figure 3:
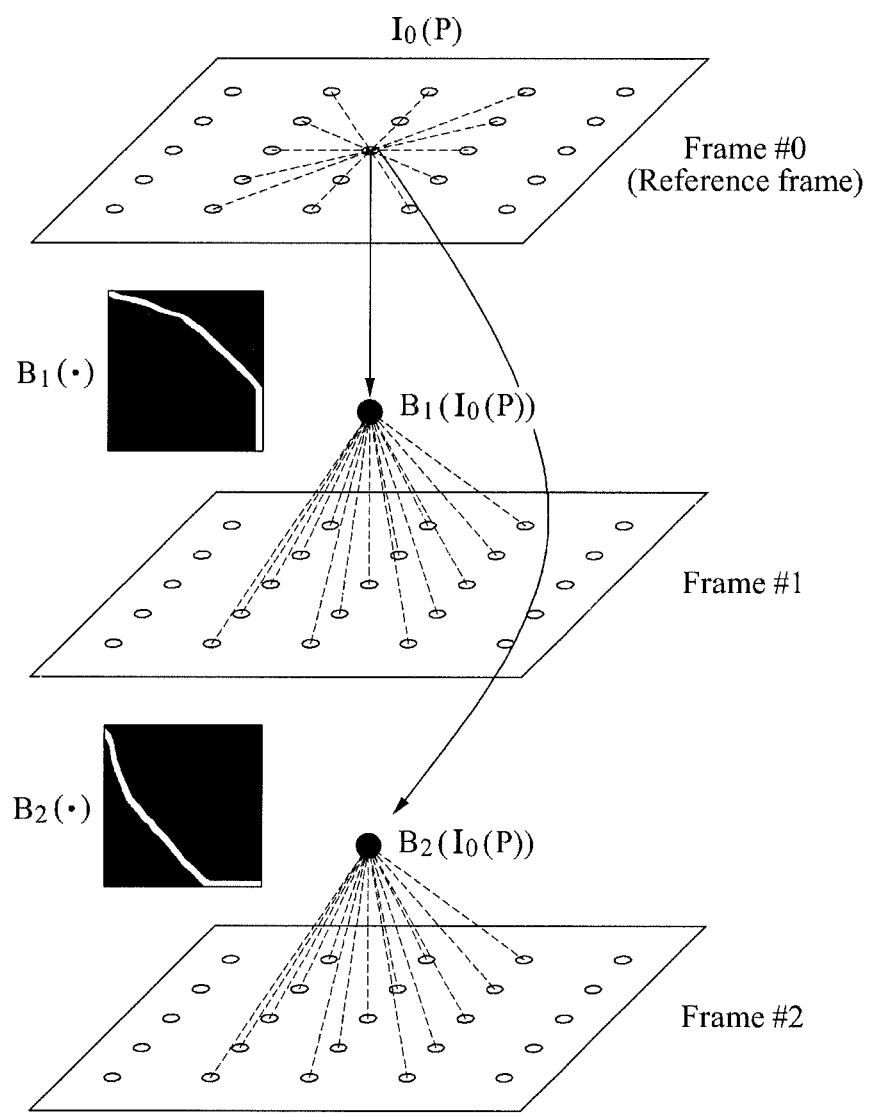
FIG. 3 illustrates a generalized filtering, according to one or more embodiments.

FIG. 3 illustrates a generalized filtering, such as performed using Equation 4, according to one or more embodiments.

A scheme of determining a final radiance with respect to the reference frame Frame #0, and Frame #1 and Frame #2 will be described below with reference to FIG. 3, noting that alternative schemes are also available. Accordingly, in one or more embodiments, in FIG. 3, the final radiance may be determined by filtering a wider area from an image using the three weight functions $c_{n_0,n}(p,q)$, $d(p,q)$, and $w(z)$ of Equation 4.

More specifically, in an embodiment, $c_{n_0,n}(p,q)$ may be interpreted as a weight for a color difference between a brightness intensity value 'In0' of a reference frame 'n0' and a brightness intensity value 'Bn(In0)' obtained using a global transfer function 'Bn( )', for example.

Here, in such an embodiment or alternative embodiment, d(p,q) may be interpreted as a weight for a geometric distance between a position p of the reference frame and a position q of another frame, for example.

Additionally, in such an embodiment or alternative embodiment, w(z) may be interpreted as a weight for an intensity of Equation 3, for example.

In one or more corresponding embodiments, N(p) may denote a set of all pixels in a window having a pixel p as a center.

Therefore, the HDRI creation unit 200 may calculate a final radiance value, e.g., $\hat{E}(p)$, of the pixel p through the filtering using Equation 4.

Referring back to FIG. 2, as noted, the HDRI creation unit 200 may perform the generalized filtering by applying locally weighted average filtering schemes, as well as a concept of the bilateral filter.

For example, a Non-Local Means Filtering scheme may be applied, instead of the bilateral filter, to perform the generalized filtering.

Therefore, the HDRI creation unit 200 may be used to remove a ghost area and to calculate a radiance of a reference frame, without directly searching for a predetermined ghost area. Thus, it is possible to reduce the noise of the entire image without a direct search for a predetermined ghost area.

An HDRI creation apparatus, e.g., including such a HDRI creation unit 200, may define a ghost area using a probability based on a global transfer function indicating a relationship for intensities of several frames, rather than specifically or directly determining the ghost area in an image. Therefore, it is possible effectively prevent a ghost phenomenon from occurring when a single HDRI is created from a plurality of LDRIs.

Additionally, the HDRI creation apparatus may be used to implement various high function photography units or operations, for example, respectively for panorama photography, HDR photography, low-light and high-sensitivity photography, ultra resolution photography, and the like, using consecutive multiple frames with varying exposures.

Furthermore, in one or more embodiments, the HDRI creation apparatus may be expected to have high function units or operation capabilities through the processing of multiple frames with varying exposures, and may be easily applied to a Personal Computer (PC), a Digital Television (DTV), a Set-Top Box (STB), mobile device, and the like, as only examples, that are used in home and typically accessible, as well as a mobile media device such as a high performance camera, a high performance mobile phone, tablet computing device, and the like, as only examples.

FIG. 4 illustrates an HDRI creation method, according to one or more embodiments.

The HDRI creation method of FIG. 4 may include collecting a plurality of Low Dynamic Range Images (LDRIs) while varying an exposure of one or more image capturing devices, determining a reference frame among the plurality of collected LDRIs, comparing the determined reference frame to each of the plurality of collected LDRIs, and determining a joint probability function, so that a High Dynamic Range Image (HDRI) may be created based on the determined joint probability function, for example.

Specifically, in operation 410, the plurality of LDRIs may be collected and stored in non-volatile memory and/or a temporary volatile memory, while varying the exposure of at least one image capturing device. In one or more embodiments, the plurality of LDRIs are captured while there is relative movement between an image capturing device and the object(s) desired to be captured. For example, an object desired to be captured may be moving while the an image capturing device is attempting to capture the object, such as in a panoramic scene where the movement of the object changes the fixed position of the object relative to the moving image capturing device. Alternatively, in an embodiment, the object may not be moving and only the image capturing device is moving. In operation 420, a reference frame may be identified among the plurality of collected LDRIs.

Here, each respective visibility of the plurality of collected LDRIs may be determined, and a frame of an image having a determined best visibility, e.g., based upon particular criteria, among the plurality of collected LDRIs may be determined to be the appropriate reference frame.

In operation 430, the determined reference frame may be compared to each of the plurality of collected LDRIs, and a joint probability function may be determined.

Specifically, in operation 440, a joint histogram may be calculated for each exposure of the plurality of LDRIs, based on a result of the comparing in operation 440. In operation 450, the joint probability function may be determined based on the calculated joint histogram.

According to one or more embodiments, a joint histogram for an intensity value at a same location may be calculated based on a probabilistic relationship of a global intensity between frames having different exposures.

In operation 460, a global transfer function may be determined based on the determined joint probability function.

Here, in an embodiment, the global transfer function is a relationship for intensities of a plurality of frames, e.g., LDRIs, noting that alternatives are available.

In operation 470, a High Dynamic Range (HDR) radiance map may be generated based on the determined global transfer function.

As only an example, a generalized filtering based on a bilateral filter may be performed with respect to the determined global transfer function, and an HDR radiance map may be generated.

In operation 480, a High Dynamic Range Image (HDRI) may be created based on the created HDR radiance map, and the created HDRI may thereafter be stored in one of the memories 111, or alternative memories, including a memory remote from a corresponding HDRI creation apparatus, such as shown in FIG. 1. Accordingly, the HDRI creation apparatus 100 shown in FIG. 1 may include a transmitting or outputting aspect and/or device to forward the created HDRI to a separate portion of an overall system or an external device and/or memory.

According to one or more embodiments, it is possible to effectively prevent a ghost phenomenon from occurring when a single HDRI is created from a plurality of LDRIs, by defining a ghost area using a probability based on a global transfer function indicating a relationship for intensities of several frames, rather than specifically searching for or identifying the ghost area in a single image or each image, for example.

Additionally, according to the one or more embodiments, it is possible to implement various high function photography units or operations, for example, respectively for panorama photography, HDR photography, low-light and high-sensitivity photography, ultra resolution photography, and the like, as only examples, using consecutive multiple frames with varying exposures.

Furthermore, according to one or more embodiments, an apparatus expected to have high function units or operation capabilities through the processing of multiple frames with varying exposures may be easily applied to a PC, a DTV, an STB, mobile device, and the like, as only examples, that are used in home and typically accessible, as well as a mobile media device such as a high performance camera, a high performance mobile phone, tablet computing device, and the like, as only examples.

In one or more embodiments, any apparatus, system, and unit descriptions herein include one or more hardware devices and/or hardware processing elements/devices. In one or more embodiments, any described apparatus, system, and unit may further include one or more desirable memories, and any desired hardware input/output transmission devices, as only examples. Further, the term apparatus should be considered synonymous with elements of a physical system, not limited to a device, i.e., a single device at a single location, or enclosure, or limited to all described elements being embodied in single respective element/device or enclosures in all embodiments, but rather, depending on embodiment, is open to being embodied together or separately in differing devices or enclosures and/or differing locations through differing hardware elements.

In addition to the above described embodiments, embodiments can also be implemented through computer readable code/instructions in/on a non-transitory medium, e.g., a computer readable medium, to control at least one processing element/device, such as a processor, computing device, computer, or computer system with peripherals, to implement any above described embodiment. The medium can correspond to any defined, measurable, and tangible structure permitting the storing and/or transmission of the computer readable code. Additionally, one or more embodiments include the at least one processing element or device.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and/or perform program instructions, such as read-only memory (ROM), random access memory (RAM), flash memory, and the at least one processing device, respectively. Computer readable code may include both machine code, such as produced by a compiler, and files containing higher level code that may be executed by the computer using an interpreter, for example. The media may also be any defined, measurable, and tangible elements of one or more distributed networks, so that the computer readable code is stored and/or executed in a distributed fashion. In one or more embodiments, such distributed networks do not require the computer readable code to be stored at a same location, e.g., the computer readable code or portions of the same may be stored remotely, either stored remotely at a single location, potentially on a single medium, or stored in a distributed manner, such as in a cloud based manner. Still further, as noted and only as an example, the processing element could include a processor or a computer processor, and processing elements may be distributed and/or included in a single device. There may be more than one processing element and/or processing elements with plural distinct processing elements, e.g., a processor with plural cores, in which case one or more embodiments would include hardware and/or coding to enable single or plural core synchronous or asynchronous operation.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A High Dynamic Range Image (HDRI) creation apparatus, comprising:
   a Low Dynamic Range Image (LDRI) collector, including at least one of one or more processing devices, configured to collect a plurality of LDRIs while varying an exposure of one or more image capturing devices; and
   an HDRI creator, as at least one of the one or more processing devices, configured to identify a reference frame from among the plurality of collected LDRIs, to determine a joint probability function by comparing the identified reference frame to each of remaining LDRIs of the plurality of collected LDRIs, to determine a global transfer function representing a relationship between intensities of the reference frame and the remaining LDRIs based on the determined joint probability function, to define an area where a ghost occurs using the joint probability function, and to create an HDRI based on the determined global transfer function.

2. The HDRI creation apparatus of claim 1, wherein the HDRI creator comprises a joint probability function determiner, and
   wherein the joint probability function determiner comprises:
      a reference frame determiner configured to identify the reference frame from among the plurality of collected LDRIs; and
      a joint histogram calculator configured to compare the identified reference frame to each of the remaining LDRIs, and to calculate a joint histogram for each respective exposure of the plurality of collected LDRIs, and
      wherein the joint probability function determiner is configured to determine the joint probability function based on the calculated joint histogram.

3. The HDRI creation apparatus of claim 2, wherein the reference frame determiner is configured to identify, as the reference frame, a frame of an image having a determined best visibility among the plurality of collected LDRIs.

4. The HDRI creation apparatus of claim 2, wherein the joint probability function is a probabilistic relationship regarding a global intensity of each of the plurality of collected LDRIs having different exposures,
   wherein the joint histogram, based on the joint probability function, is based on an intensity value at a same location as the joint probability function.

5. A High Dynamic Range Image (HDRI) creation apparatus, comprising:
   a Low Dynamic Range Image (LDRI) collector, including at least one of one or more processing devices, configured to collect a plurality of LDRIs while varying an exposure of one or more image capturing devices; and
   an HDRI creator, as at least one of the one or more processing devices, configured to identify a reference frame from among the plurality of collected LDRIs, to compare the identified reference frame to each of the plurality of collected LDRIs, to determine a joint probability function based on the comparison, and to create an HDRI based on the determined joint probability function,
   wherein the HDRI creator further comprises a global transfer function determiner configured to determine a global transfer function based on the determined joint probability function, and
   wherein the global transfer function is calculated by applying a Mean Squared Error Estimate (MSEE) to the joint probability function for the reference frame.

6. The HDRI creation apparatus of claim 1, wherein the HDRI creator further comprises a High Dynamic Range (HDR) radiance map generator configured to perform a generalized filtering based on a bilateral filter with respect to the determined global transfer function, and to generate the HDR radiance map based on the generalized filtering, and
   wherein the HDRI creator is configured to create the HDRI based on the generated HDR radiance map.

7. A High Dynamic Range Image (HDRI) creation method, comprising:
   collecting a plurality of Low Dynamic Range Images (LDRIs) while varying an exposure of one or more image capturing devices;
   identifying a reference frame from among the plurality of collected LDRIs;
   comparing the identified reference frame to each of remaining LDRIs of the plurality of collected LDRIs, and determining a joint probability function based on the comparing;
   determining a global transfer function representing a relationship between intensities of the reference frame and the remaining LDRIs based on the determined joint probability function;
   defining an area where a ghost occurs using the joint probability function; and
   creating an HDRI based the determined global transfer function.

8. The HDRI creation method of claim 7, wherein the comparing of the identified reference frame comprises:
   comparing the identified reference frame to each of the remaining LDRIs, and calculating a joint histogram for each respective exposure of the plurality of collected LDRIs; and
   determining the joint probability function based on the calculated joint histogram.

9. The HDRI creation method of claim 7, wherein the identifying of the reference frame comprises identifying, as the reference frame, a frame of an image having a determined best visibility among the plurality of collected LDRIs.

10. The HDRI creation method of claim 7, wherein the creating of the HDRI comprises:
performing a generalized filtering based on a bilateral filter with respect to the determined global transfer function, and generating the HDR radiance map based on the generalized filtering; and
creating the HDRI based on the generated HDR radiance map.

11. A non-transitory computer readable medium comprising computer readable code to control at least one processing device to implement the method of claim 7.

12. The HDRI creation apparatus of claim 1, wherein the HDRI is created by performing a generalized filtering of the plurality of collected LDRIs with respect to the global transfer function.

13. The HDRI creation apparatus of claim 12, wherein a radiance value for a particular pixel of the HDRI is determined by performing the generalized filtering for the particular pixel.

14. The HDRI creation apparatus of claim 1, wherein the global transfer function is calculated by applying a Mean Squared Error Estimate (MSEE) to the joint probability function for the reference frame.

15. The HDRI creation method of claim 7, wherein the creating of the HDRI includes performing a generalized filtering of the plurality of collected LDRIs with respect to the global transfer function.

16. The HDRI creation method of claim 15, wherein the creating of the HDRI further includes determining a radiance value for a particular pixel of the HDRI by performing the generalized filtering for the particular pixel.

17. A High Dynamic Range Image (HDRI) creation apparatus, comprising:
an HDRI creator, as at least one of one or more processing devices, configured to identify a reference frame from among a plurality of collected Low Dynamic Range Images (LDRIs), to determine a global transfer function, representing a relationship between intensities of the reference frame and remaining LDRIs of the plurality of collected LDRIs, based on a joint probability function of the LDRIs, to define an area where a ghost occurs using the joint probability function, and to create an HDRI based on determined global transfer function.

18. The HDRI creation apparatus of claim 17, further comprising an LDRI collector, including at least one of the one or more processing devices, configured to collect the plurality of LDRIs while varying an exposure of one or more image capturing devices.

19. The HDRI creation apparatus of claim 17, wherein the HDRI is created by performing a generalized filtering of the plurality of collected LDRIs with respect to the global transfer function.

20. The HDRI creation apparatus of claim 19, wherein a radiance value for a particular pixel of the HDRI is determined by performing the generalized filtering for the particular pixel.

21. A High Dynamic Range Image (HDRI) creation method, comprising:
identifying a reference frame from among a plurality of collected Low Dynamic Range Images (LDRIs);
determining a global transfer function, representing a relationship between intensities of the reference frame and remaining LDRIs of the plurality of collected LDRIs, based on a joint intensity probability function of the LDRIs;
defining an area where a ghost occurs using the joint probability function; and
creating an HDRI based on the determined global transfer function.

22. The HDRI creation method of claim 21, further comprising collecting the plurality of LDRIs while varying an exposure of one or more image capturing devices.

23. The HDRI creation method of claim 21, wherein the creating of the HDRI includes performing a generalized filtering of the plurality of collected LDRIs with respect to the global transfer function.

24. The HDRI creation method of claim 23, wherein the creating of the HDRI includes determining a radiance value for a particular pixel of the HDRI by performing the generalized filtering for the particular pixel.

25. A High Dynamic Range Image (HDRI) creation apparatus, comprising:
a Low Dynamic Range Image (LDRI) collector, including at least one of one or more processing devices, configured to collect a plurality of LDRIs while varying an exposure of one or more image capturing devices; and
an HDRI creator, as at least one of the one or more processing devices, configured to identify a reference frame from among the plurality of collected LDRIs, to determine a joint probability function by comparing the identified reference frame to each of remaining LDRIs of the plurality of collected LDRIs, to determine a global transfer function representing a relationship between intensities of the reference frame and the remaining LDRIs based on the determined joint probability function, and to create an HDRI based on the determined global transfer function,
wherein the global transfer function is calculated based on an error estimate being applied to the joint probability function.

26. A High Dynamic Range Image (HDRI) creation apparatus, comprising:
a Low Dynamic Range Image (LDRI) collector, including at least one of one or more processing devices, configured to collect a plurality of LDRIs while varying an exposure of one or more image capturing devices; and
an HDRI creator, as at least one of the one or more processing devices, configured to identify a reference frame from among the plurality of collected LDRIs, to determine a joint probability function by comparing the identified reference frame to each of remaining LDRIs of the plurality of collected LDRIs, to determine a global transfer function representing a relationship between intensities of the reference frame and the remaining LDRIs based on the determined joint probability function, to perform a generalized filtering based on a filter using locally weighted average filtering with respect to the determined global transfer function, and to create an HDRI based on the determined global transfer function.

* * * * *

UNITED STATES PATENT AND TRADEMARK OFFICE
CERTIFICATE OF CORRECTION

PATENT NO.       : 8,942,509 B2                         Page 1 of 1
APPLICATION NO.  : 13/158804
DATED            : January 27, 2015
INVENTOR(S)      : Joon Hyuk Cha et al.

It is certified that error appears in the above-identified patent and that said Letters Patent is hereby corrected as shown below:

In the Claims

Column 10, Line 54, In Claim 7, delete "based" and insert -- based on --, therefor.
Column 11, Line 43, In Claim 17, delete "on" and insert -- on the --, therefor.

Signed and Sealed this
Fourteenth Day of July, 2015

Michelle K. Lee
*Director of the United States Patent and Trademark Office*